United States Patent
Bassily et al.

[11] Patent Number: 6,030,007
[45] Date of Patent: Feb. 29, 2000

[54] CONTINUALLY ADJUSTABLE NONRETURN KNOT

[75] Inventors: Samir F. Bassily, Los Angeles; Joseph Uribe, Long Beach, both of Calif.

[73] Assignee: Hughes Electronics Corporation, El Segundo, Calif.

[21] Appl. No.: 08/888,486

[22] Filed: Jul. 7, 1997

[51] Int. Cl.$^7$ .................................................. B65H 69/04
[52] U.S. Cl. ............................................ 289/1.5; 289/1.2
[58] Field of Search ........................... 289/1.2, 1.5, 18.1, 289/15

[56] References Cited

U.S. PATENT DOCUMENTS 4,918,785   4/1990   Spinner et al. ...................... 16/114 B

OTHER PUBLICATIONS

Encyclopedia of Knots and Fancy Rope Work, Graumont and Hensel, pp. 610–611, published 1945.

*Primary Examiner*—Michael A. Neas
*Attorney, Agent, or Firm*—Georgann S. Grunebach; M. W. Sales

[57] ABSTRACT

A method of fastening a line to an object to form a continually adjustable nonreturn knot to adjust the length and tension of the line. The line is passed from one side of an object to another through one or more holes in the object and one portion is tucked under another portion of itself, creating a nip, to pinch the one portion against a surface of the object. The friction added by the nip is sufficient to prevent the line from being pulled through the knot in one direction but is insufficient to prevent it from being pulled through in the opposite direction. In variations of the embodiments of the knot, a release line is also attached to the line proximate the nip to relieve the friction added by the nip sufficiently to allow the line to be pulled through the knot in either direction.

8 Claims, 2 Drawing Sheets

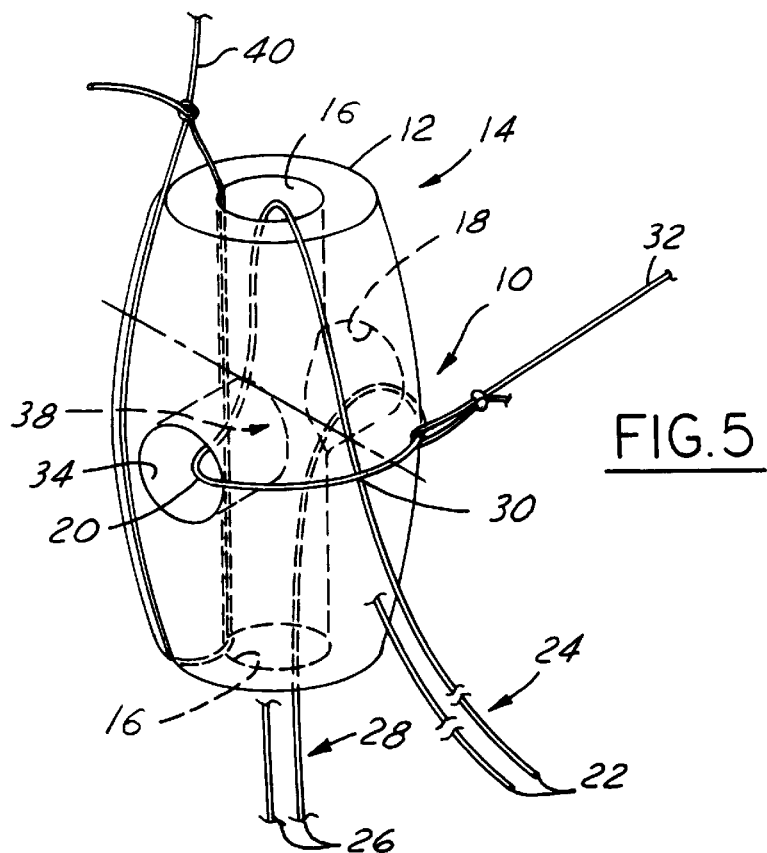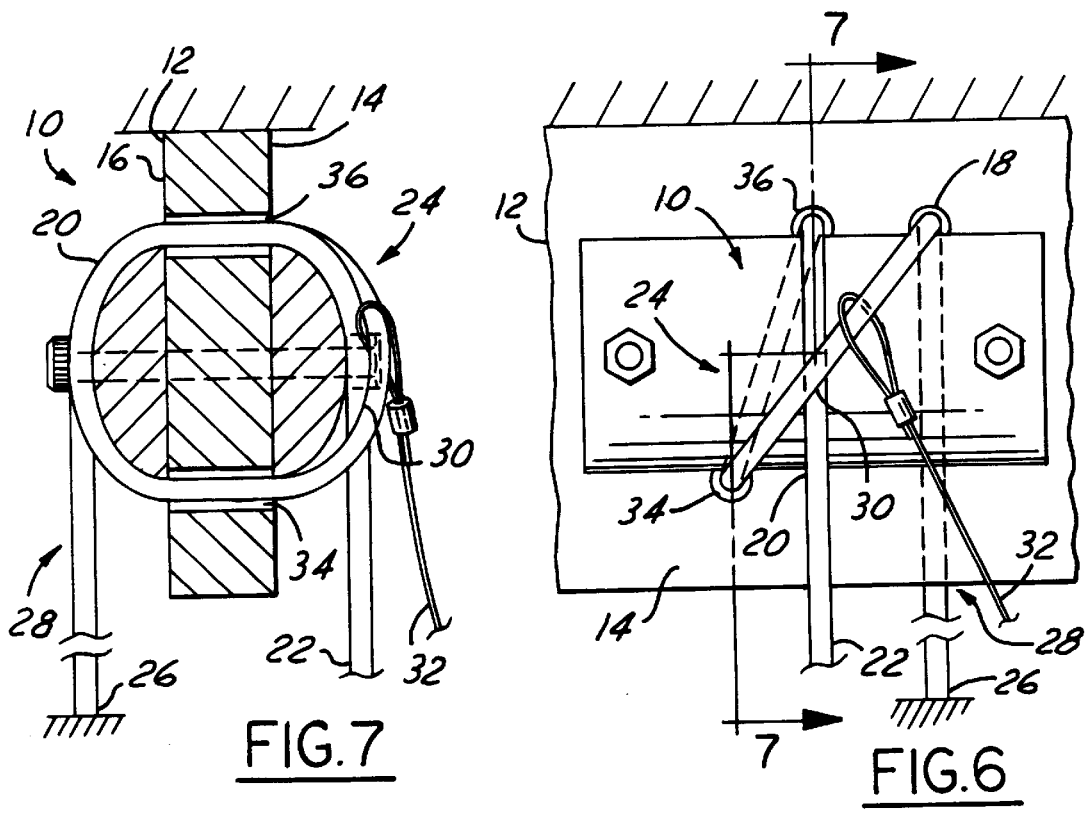

CONTINUALLY ADJUSTABLE NONRETURN KNOT

TECHNICAL FIELD

This invention relates generally to methods for fastening a flexible line to an object and specifically to methods for fastening a line to such an object so that tension on the line and the length thereof is continually adjustable and increases of tension are automatically maintained.

BACKGROUND ART

Typical adjustable attachment devices include threaded rods. Although such devices provide strong and finely adjustable connections, they have a limited range of travel, are significantly heavier, are more complicated and are more expensive than the present invention. Temporary adjustable attachment devices with bonded, that is, potted, connections, although lighter and less expensive than the previously described devices, are still heavier, more expensive and more time consuming to operate than the present invention. Moreover, they are difficult to readjust after having been installed and adjusted.

Conventional knot attachments require a trial-and-error method of adjustment. Their adjustment is not only more time consuming than that of the present invention, it is also less accurate.

Applications requiring a wide range of adjustability often use a chain or a rack with a ratchet or a ratchet gear. These permit only coarse adjustments, however, equal to the length of the chain link or the distance between gear teeth.

While the various prior techniques function with a certain degree of competence, none discloses the advantages of the continually adjustable nonreturn knots of the present invention as are hereinafter more fully described.

DISCLOSURE OF THE INVENTION

An object of the present invention is to provide a method of attaching a line to an object so that its tension and length can be finely adjusted by pulling one of its two ends, the line being permitted to slip in only one direction, thereby maintaining any set length and tension.

An advantage of the present invention is that it provides a method of adjustable attachment that is quick and easy to adjust.

Another advantage is that it provides a method of adjustable attachment that is quick and easy to release.

Still another advantage is that it provides a method of adjustable attachment that is inexpensive to produce and install.

Yet another advantage is that, due to its low mass, dynamic loads do not break friction, and the knot remains secure in a vibrating environment.

Another advantage is that it provides a method of adjustable attachment that minimizes weight.

The continuously adjustable nonreturn knot of the present invention finds application in maintaining proper mesh tension in large deployable mesh reflectors used on satellite systems and as a manual safety brake during the deployment and storage of the reflectors. The knot also finds applications in mountain climbing, for example, where a safety rope using this knot is attached to a climber's belt or harness and acts as a "ratchet," allowing the climber to move upward but locking if the climber should fall. Other obvious applications are also found in boating and fishing wherever a knot that allows a line to pass through it in only one direction would be useful.

In realizing the aforementioned and other objects, advantages and features of the present invention, a method of fastening a line to an object to form a continually adjustable nonreturn knot is provided. The line has a working end, a working part, a standing end and a standing part. The object has a front surface portion and a rear surface portion and has at least three separate passages extending therebetween.

The working end of the line is threaded through a first passage in the object, from the rear surface portion to the front surface portion thereof. The working end of the line is then passed from the front surface portion of the object to the rear surface portion thereof along a second passage spaced apart from the first passage. The working end of the line is then passed from the rear surface portion of the object to the front surface portion thereof along a third passage. The first passage, the second passage, and the third passage are spaced apart from each other.

Next, the working end of the line is passed along the front surface portion of the object and threaded between the working part of the line extending from the first to the second passage and the front surface portion of the object. This creates a nip, that is, a point of pressure, where the line is pinched therebetween. The nip adds a sufficient amount of friction to that produced at other areas of contact between the working part of the line and the object to prevent the line from being pulled through the knot from the direction of the standing end. The nip, however, adds an insufficient amount of friction to prevent the line from being pulled through the knot from the direction of the working end. This allows length and tension of the standing part of the line to be continually adjusted by pulling on the working end of the line.

As an added feature, a release line is attached, proximate the nip, to the working part of the line extending from the first to the second passage. When the release line is pulled, it relieves the friction introduced at the nip. This allows the line to be pulled through the knot from the direction of the standing end of the line when the release line is pulled.

The objects, advantages and features of the present invention are readily apparent from the following detailed description of the best mode for carrying out the invention when taken in connection with the accompanying drawings.

BRIEF DESCRIPTION OF THE DRAWINGS

A more complete appreciation of the invention and many of the attendant advantages and features thereof may be readily obtained by reference to the following detailed description when considered with the accompanying drawings in which like reference characters indicate corresponding parts in all the views, wherein:

FIG. 5 is a perspective view, partially in phantom lines, of a fourth preferred embodiment of the present invention;

FIG. 6 is a plan view, partially broken away and partially in phantom lines, of a fifth preferred embodiment of the present invention; and FIG. 7 is a side view, partially in section taken along the line 7—7 and partially in phantom lines, of the embodiment shown in FIG. 6.

The objects, features and advantages of the present invention are readily apparent from the following detailed description of the best mode for carrying out the invention when taken in connection with the accompanying drawing figures.

BEST MODE FOR CARRYING OUT THE INVENTION

This patent application incorporates by reference a first patent application titled Tensioning Retention, and Management Systems for Mesh Reflectors, invented by Samir F. Bassily and Joseph Uribe, and assigned to Hughes Aircraft Company (PD 970125) and a second patent application titled Edge Supported Umbrella Reflector with Low Storage Profile, invented by Samir F. Bassily, and assigned to Hughes Aircraft Company (PD 970097).

Figure 1:
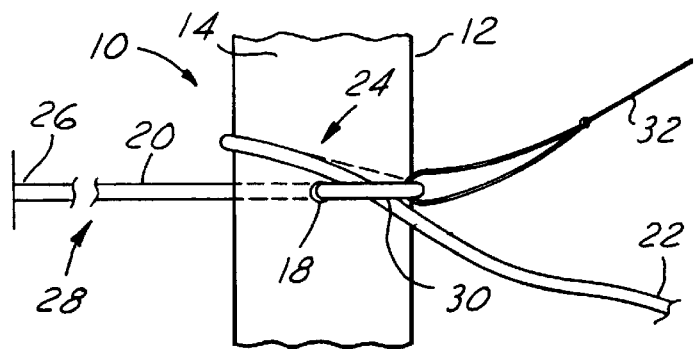
FIG. 1 is a plan view, partially broken away and partially in phantom lines, of a first preferred embodiment of the present invention.
Figure 4:
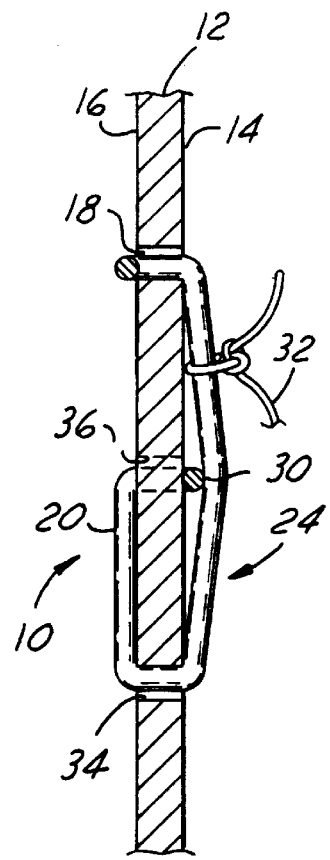
FIG. 4 is a side view, partially broken away, partially in section taken along the line 4—4 and partially in phantom lines, of the embodiment shown in FIG. 3 and taken along the line 4—4.

Shown in FIG. 1 of the drawings is a plan view, partially broken away and partially in phantom lines, of a first preferred embodiment of the continually adjustable nonreturn knot, generally indicated by reference numeral 10. Shown is an object 12 having a front surface portion 14 and a rear surface portion 16 (FIG. 4). The object 12 (FIG. 1) also has at least three separate passages extending between the front surface portion 14 and the rear surface portion 16 (FIG. 4).

Shown also is a line 20. It should be understood that the term "line" has been used herein as a generic term including in its range of meanings string, wire, cord, rope and wire cable. The line 20 has a working end 22 at the end of the line 20 at which the knot 10 has been formed. The line also has a working part, generally indicated by reference numeral 24, which is the portion of the line 20 used in forming the knot 10. At the opposite end of the line 20, there is a standing end 26. That portion of the line 20 between the two ends thereof and not part of the knot 10 is a standing part, generally indicated by reference numeral 28.

As shown in FIG. 1, the working end 22 of the line 20 is threaded through a first passage, which is formed by the first hole 18 in the object 12, from the rear surface portion 16 (FIG. 4) to the front surface portion 14 (FIG. 1) thereof. The working end 22 of the line 20 is then passed from the front surface portion 14 of the object 12 to the rear surface portion 16 thereof along a second passage spaced apart from the first passage. The working end 22 of the line 20 is then passed from the rear surface portion 16 (FIG. 4) of the object 12 to the front surface portion 14 (FIG. 1) thereof along a third passage. The first passage, the second passage, and the third passage are spaced apart from each other.

The working end 22 of the line 20 is next passed along the front surface portion 14 of the object 12 and threaded between the working part 24 of the line extending from the first to the second passage and the front surface portion 14 of the object 12. This creates a nip 30 where the line 20 is pinched therebetween. The nip 30 adds a sufficient amount of friction to that produced at other areas of contact between the working part 24 of the line 20 and the object 12 to prevent the line 20 from being pulled through the knot 10 from the direction of the standing end 26. The nip 30, however, adds an insufficient amount of friction to prevent the line 20 from being pulled through the knot 10 from the direction of the working end 22. This allows the length and tension of the standing part 28 of the line 20 to be continually adjusted by pulling on the working end 22 of the line 20.

It should be understood that, to enable a viewer to more clearly distinguish elements of the invention and their relative spatial relationships, the drawing figures are not drawn to scale. For example, in FIG. 4, the length of the portion of the line 20 between the first hole 18 and the second hole 34, being proportional to the diameter of the line 20, would be much shorter for the line diameter shown.

In a variation of the first preferred embodiment, a release line 32 is attached, proximate the nip 30, to the working part 24 of the line 20 extending from the first to the second passage. When the release line 32 is pulled, it relieves the friction introduced at the nip 30. This allows the line 20 to be pulled through the knot 10 from the direction of the standing end 26 of the line 20. Preferably, the diameter of the release line 32 is less than that of the line 20.

Figure 2:
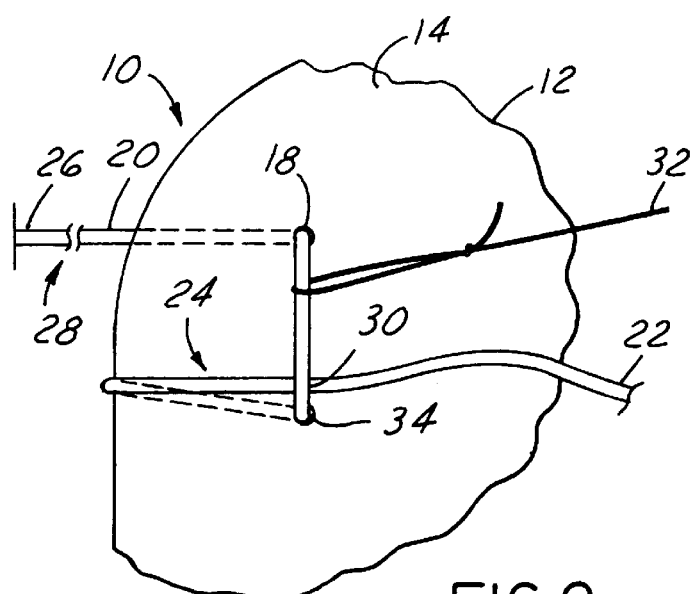
FIG. 2 is a plan view, partially broken away and partially in phantom lines, of a second preferred embodiment of the present invention.

Shown in FIG. 2 of the drawings is a plan view, partially broken away and partially in phantom lines, of a second preferred embodiment of the continually adjustable nonreturn knot 10. Shown is an object 12 having a front surface portion 14 and a rear surface portion 16 (FIG. 4). The object 12 (FIG. 2) has a first passage, including a first hole 18, and a second passage, including a second hole 34, extending between the front surface portion 14 and the rear surface portion 16 (FIG. 4) thereof. The object also has a third passage connecting the two surface portions by going around the left edge of the object.

As also shown in FIG. 2, the working end 22 of the line 20 is threaded through the first passage, including the first hole 18, from the rear surface portion 16 (FIG. 4) of the object 12 to the front surface portion 14 thereof. It is then threaded through the second passage, including the second hole 34, from the front surface portion 14 of the object 12 to the rear surface portion 16 (FIG. 4). It is next passed around the edge of the object 12 from the rear surface portion 16 (FIG. 4) of the object 12 to the front surface portion 14 thereof along a third passage. The working end 22 of the line 20 is next threaded between the line 20 and the front surface portion 14 of the object 12. This creates a nip 30 where the line 20 is pinched therebetween. The nip 30 is disposed between the first hole 18 and the second hole 34.

In a variation of the second preferred embodiment, a release line 32 is attached, proximate the nip 30, to the line 20 between the first passage, including the first hole 18, and the second passage, including the second hole 34, in the object. When the release line 32 is pulled, it relieves the friction introduced at the nip 30. This allows the line 20 to be pulled through the knot 10 from the direction of the standing end 26 of the line 20. Preferably, the diameter of the release line 32 is less than that of the line 20.

Figure 3:
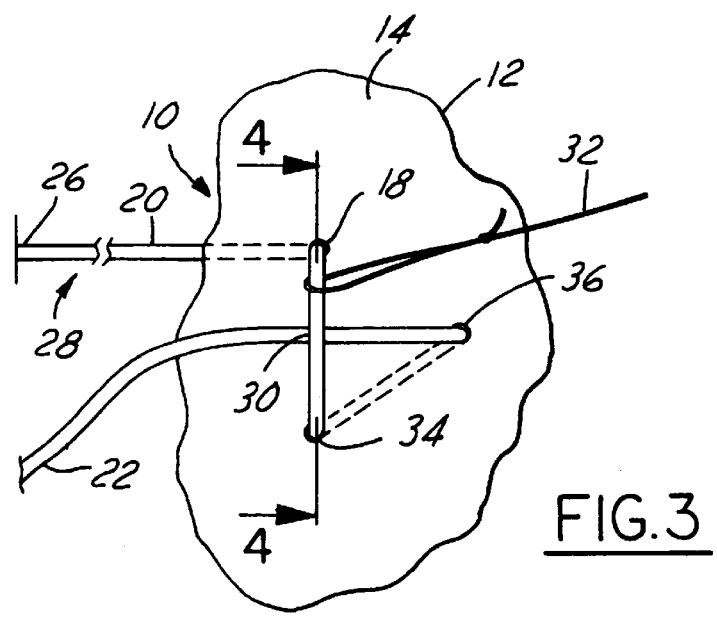
FIG. 3 is a plan view, partially broken away and partially in phantom lines, of a third preferred embodiment of the present invention.

Shown in FIGS. 3 and 4 of the drawings is a plan view, partially broken away and partially in phantom lines, of a third preferred embodiment of the continually adjustable nonreturn knot 10. Shown is an object 12 having a front surface portion 14 and a rear surface portion 16 (FIG. 4). The object 12 has a first hole 18, a second hole 34, and a third hole 36 extending between the front surface portion 14 and the rear surface portion 16 (FIG. 4) thereof.

As also shown in FIGS. 3 and 4, the working end 22 of the line 20 is threaded through the first passage, which includes the first hole 18, from the rear surface portion 16 (FIG. 4) of the object 12 to the front surface portion 14 thereof. It is then threaded through the second passage, which includes the second hole 34, from the front surface portion 14 of the object 12 to the rear surface portion 16 (FIG. 4) thereof along a second passage. It is then threaded through the third passage, which includes the third hole 36, from the rear surface portion 16 (FIG. 4) of the object 12 to the front surface portion 14. The working end 22 of the line 20 is next threaded between the line 20 and the front surface portion 14 of the object 12. This creates a nip 30 where the line 20 is pinched therebetween. The nip 30 is disposed between the first hole 18 and the second hole 34.

In a variation of the third preferred embodiment, a release line 32 is attached, proximate the nip 30, to the line 20 between the first hole 18 and the second hole 34 in the object. When the release line 32 is pulled, it relieves the friction introduced at the nip 30. This allows the line 20 to be pulled through the knot 10 from the direction of the standing end 26 of the line 20. Preferably, the diameter of the release line 32 is less than that of the line 20.

FIG. 5 shows, in perspective a fourth preferred embodiment of the present invention. Shown is an object 12. Although the object 12 is shown to be roughly barrel-shaped, it should be understood that it could have any of a number of configurations, its primary purpose is to act as a splicing point at which a tensioning line 40 is spliced to one or more lines 20, whereby the length and tension of each of the lines 20 can be independently adjusted. The object has a "front" surface 14 constituted of its outside surface and a "back" surface 16 constituted of the inside surface of a vertical through drilled hole. The object 12 has a first passage, which includes a first hole 18 connecting the inner hole surface 16 to the rear-facing portion of the outside surface 14 and has a second passage, which includes a second hole 34 connecting the inner hole surface 16 to the frontfacing portion of the outside surface 14. The first passage 18 and the second passage 34 both emanate from a location near the middle of the vertical through drilled hole, generally indicated by reference numeral 38.

As in the previous three embodiments, the first passage 18 and the second passage 34 each extend between the front (outer) surface portion 14 and the rear (inner) surface portion 16 of the object 12. As can be seen from FIG. 5, at least one additional (third) passage connecting the outside surface 14 to the inside surface 16 can be prescribed by going over the top edge of the outside surface 14 into the top edge of the outside surface 14 into the top edge of the vertical hole inside surface 16.

As shown in FIG. 5, the working end 22 of the line 20 is threaded through the first passage, including the first hole 18, from the inside (rear) surface portion 16 of the object 12 to the outside (front) surface portion 14. A pair of lines are shown to indicate that more than one line can be used, if desired, in this embodiment, the length and tension of each being individually adjustable. The line is then passed around the object 12 then threaded through the second passage, which includes the second hole 34, from the outside (front) surface portion 14 of the object 12 to the inside (rear) surface portion 16. It is next passed around the upper (top) edge of the object 12 from the inside (rear) surface to the top of the outside (front) surface 14 along the third passage. The working end 22 of the line 20 is next threaded between the line 20 and the outside (front) surface portion 14 of the object 12.

This creates a nip 30 where the line 20 is pinched therebetween. The nip 30 is disposed between the first hole 18 and the second hole 34. The curved surface of the object 12 increases the pinching force applied by the nip and thus increases the friction between the line 20 and the surface of the object. A tensioning line 40 is attached to the object 12 by threading it through the central vertical hole so that the object 12 can be disposed between the standing part of the line forming the knot 10 and the tensioning line 40 to adjust the tension of both.

In a variation of the fourth preferred embodiment, a release line 32 is attached, proximate the nip 30, to the line 20 between the first hole 18 and the second hole 34 in the object 12. When the release line 32 is pulled, it relieves the friction introduced at the nip 30. This allows the line 20 to be pulled through the knot 10 from the direction of the standing end 26 of the line 20. Preferably, the diameter of the release line 32 is less than that of the line 20.

FIG. 6 shows a fifth preferred embodiment of the present invention. It is similar to that shown in FIG. 3 except that the object, generally indicated by reference numeral 12, is modified so that its front surface portion 14 and its rear surface portion 16 are each generally semicircularly shaped in cross section. The curved surface increases the pinching force applied by the nip 30 and thus increases the friction between the line 20 and the surface of the object 12. The fifth embodiment also provides a controlled bend radius for the line 20 as it passes through the knot 10. This is particularly advantageous for high-force applications and for those using wire cable. FIG. 7 provides a side view of the embodiment of FIG. 6.

In a variation of the fifth preferred embodiment, a release line 32 is attached, proximate the nip 30, to the line 20 between the first hole 18 and the second hole 34 in the object 12. When the release line 32 is pulled, it relieves the friction introduced at the nip 30. This allows the line 20 to be pulled through the knot 10 from the direction of the standing end 26 of the line 20. Preferably, the diameter of the release line 32 is less than that of the line 20.

While the invention has been described in detail, those familiar with the art to which this invention relates will recognize various alternative designs and embodiments for practicing the invention as defined by the following claims.

What is claimed is:

1. A method of fastening at least one line to an object to form a continually adjustable nonreturn knot, the at least one line having a working end, a working part, a standing end and a standing part, the object having a front surface portion and a rear surface portion and having at least three separate passages extending therebetween, the method comprising the steps of:

(a) threading the working end of the at least one line through a first passage in the object, from the rear surface portion to the front surface portion of the object;

(b) passing the working end of the at least one line from the front surface portion of the object to the rear surface portion thereof along a second passage spaced apart from the first passage;

(c) passing the working end of the at least one line from the rear surface portion of the object to the front surface portion thereof along a third passage, the first passage, the second passage, and the third passage being spaced apart from each other;

(d) passing the working end of the at least one line along the front surface portion of the object and threading the working end between the working part of the at least one line along the second passage and the front surface portion of the object to create a nip where the at least one line is pinched therebetween, the nip adding a sufficient amount of friction to that produced at other areas of contact between the working part of the at least one line and the object to prevent the at least one line from being pulled through the knot from the direction of the standing end but adding an insufficient amount of friction to prevent the at least one line from being pulled through the knot from the direction of the working end, thereby allowing the length and tension of the standing part of the line at least one to be continually adjusted by pulling on the working end of the at least one line; and (e) attaching a release line, proximate the nip, to the working part of the at least one line along the second passage, thereby providing a means for relieving the friction introduced at the nip sufficiently to allow the at least one line to be pulled through the knot from the direction of the standing end of the at least one line when the release line is pulled.

2. The method of claim 1, wherein the at least one line includes a plurality of lines, whereby pulling on the working end of a first of any one of the plurality of lines adjusts the tension of that one line independently of the tension of any other one of the plurality of lines.

3. A method of fastening at least one line to an object to form a continually adjustable nonreturn knot, the at least one line having a working end, a working part, a standing end and a standing part, the object having a front surface portion and a rear surface portion and having at least three separate passages extending therebetween, the method comprising the steps of:

(a) threading the working end of the at least one line through a first passage in the object, from the rear surface portion to the front surface portion of the object;

(b) passing the working end of the at least one line from the front surface portion of the object to the rear surface portion thereof along a second passage spaced apart from the first passage, wherein passing the working end of the at least one line from the front surface portion of the object to the rear surface portion thereof along a second passage spaced apart from the first passage further includes threading the working end of the at least one line through the second passage in the object from the front surface portion to the rear surface portion of the object;

(c) passing the working end of the at least one line from the rear surface portion of the object to the front surface portion thereof along a third passage, the first passage, the second passage, and the third passage being spaced apart from each other; and (d) passing the working end of the at least one line along the front surface portion of the object and threading the working end between the working part of the at least one line along the second passage and the front surface portion of the object to create a nip where the at least one line is pinched therebetween, the nip adding a sufficient amount of friction to that produced at other areas of contact between the working part of the at least one line and the object to prevent the at least one line from being pulled through the knot from the direction of the standing end but adding an insufficient amount of friction to prevent the at least one line from being pulled through the knot from the direction of the working end, thereby allowing the length and tension of the standing part of the line at least one to be continually adjusted by pulling on the working end of the at least one line, the nip being disposed between the first passage and the second passage.

4. The method of claim 3, further including step (e), which includes attaching a release line, proximate the nip, to the working part of the at least one line between the first passage and the second passage in the object, thereby providing a means for relieving the friction introduced at the nip sufficiently to allow the at least one line to be pulled through the knot from the direction of the standing end of the at least one line when the release line is pulled.

5. The method of claim 3, wherein, in step (c), passing the working end of the at least one line from the rear surface portion of the object to the front surface portion thereof along a third passage spaced apart from the first passage further includes threading the working end of the at least one line through the third passage in the object from the rear surface portion to the front surface portion of the object, the nip being disposed between the first passage and the second passage.

6. The method of claim 5, further including step (e), which includes attaching a release line, proximate the nip, to the working part of the line between the first passage and the second passage in the object, thereby providing a means for relieving the friction introduced at the nip sufficiently to allow the at least one line to be pulled through the knot from the direction of the standing end of the at least one line when the release line is pulled.

7. The method of claim 6, further including step (f), which includes attaching a tensioning line to the object by threading it through one passage therein so that the object can be disposed between the standing part of the line forming the knot and the tensioning line to adjust the tension of both.

8. A method of fastening at least one line to an object to form a continually adjustable nonreturn knot, the at least one line having a working end, a working part a standing end and a standing part, the object having a front surface portion and a rear surface portion and having at least three separate passages extending therebetween, wherein the front surface portion and the rear surface portion of the object are convexly curved, the method comprising the steps of:

(a) threading the working end of the at least one line through a first passage in the object, from the rear surface portion to the front surface portion of the object;

(b) passing the working end of the at least one line from the front surface portion of the object to the rear surface portion thereof along a second passage spaced apart from the first passage;

(c) passing the working end of the at least one line from the rear surface portion of the object to the front surface portion thereof along a third passage, the first passage, the second passage, and the third passage being spaced apart from each other, wherein passing the working end of the at least one line from the rear surface portion of the object to the front surface portion thereof along a third passage spaced apart from the first passage further includes threading the working end of the at least one line through the third passage in the object from the rear surface portion to the front surface portion of the object;

(d) passing the working end of the at least one line along the front surface portion of the object and threading the working end between the working part of the at least one line along the second passage and the front surface portion of the object to create a nip where the at least one line is pinched therebetween, the nip adding a sufficient amount of friction to that produced at other areas of contact between the working part of the at least one line and the object to prevent the at least one line from being pulled through the knot from the direction of the standing end but adding an insufficient amount of friction to prevent the at least one line from being pulled through the knot from the direction of the working end, thereby allowing the length and tension of the standing part of the line at least one to be continually adjusted by pulling on the working end of the at least one line, the nip being disposed between the first passage and the second passage, the first passage, the second passage and the third passage being spaced apart from each other, whereby at least one of the curved surface portions increases the pinching force at the nip and controls the bend radius of the at least one line as it passes through the knot.

* * * * *